United States Patent [19]

Griswold et al.

[11] Patent Number: 4,603,238

[45] Date of Patent: Jul. 29, 1986

[54] FAST INDEXING ENCODER APPARATUS

[75] Inventors: Donald R. Griswold; Richard H. Lammers, both of Scottsdale, Ariz.

[73] Assignee: Motorola, Inc., Schaumburg, Ill.

[21] Appl. No.: 534,959

[22] Filed: Sep. 22, 1983

[51] Int. Cl.⁴ .................... H01H 19/54; H03M 1/00
[52] U.S. Cl. ........................ 200/11 R; 200/8 R; 200/11 TW; 200/14; 200/153 L; 340/347 P
[58] Field of Search ............... 200/1 R, 5 R, 11 D, 200/11 DA, 14, 17 R, 18, 11 TW, 8 R, 8 A, 153 R, 153 L, 153 LA, 153 LB, 155 R, 155 A, 291, 292, 308; 340/347 P

[56] References Cited

U.S. PATENT DOCUMENTS

| | | | |
|---|---|---|---|
| 2,799,740 | 7/1957 | Blackman | 200/14 |
| 3,005,881 | 10/1961 | Ellsworth | 200/11 TW |
| 3,132,216 | 5/1964 | Adams | 200/11 TW |
| 3,267,244 | 8/1966 | Schultz | 200/8 A X |
| 3,284,583 | 11/1966 | Buzzi | 200/11 TW |
| 3,626,349 | 12/1971 | Hubrich | 200/11 TW X |
| 3,772,485 | 11/1973 | Workings | 200/11 TW |
| 3,919,506 | 11/1975 | Kellogg | 200/153 L X |
| 4,243,853 | 1/1981 | Turner | 200/8 R |

Primary Examiner—J. R. Scott
Attorney, Agent, or Firm—Eugene A. Parsons

[57] ABSTRACT

A rotatable cylinder having a plurality of drivers mounted therein for axial movement with each driver having a projection thereon extending through openings in the cylinder to engage rotatably mounted rings coaxially positioned around the cylinder and a disk having a depression therein for receiving one of said drivers at a time as the disk and cylinder are rotated. When the disk and cylinder are rotated in one direction a driver positioned in the depression engages an associated ring to rotate the ring. As the disk and cylinder are rotated in an opposite direction the first driver is cammed from the depression and a second driver drops into place. The rings engage different conductors as they rotate to provide the encoding.

10 Claims, 3 Drawing Figures

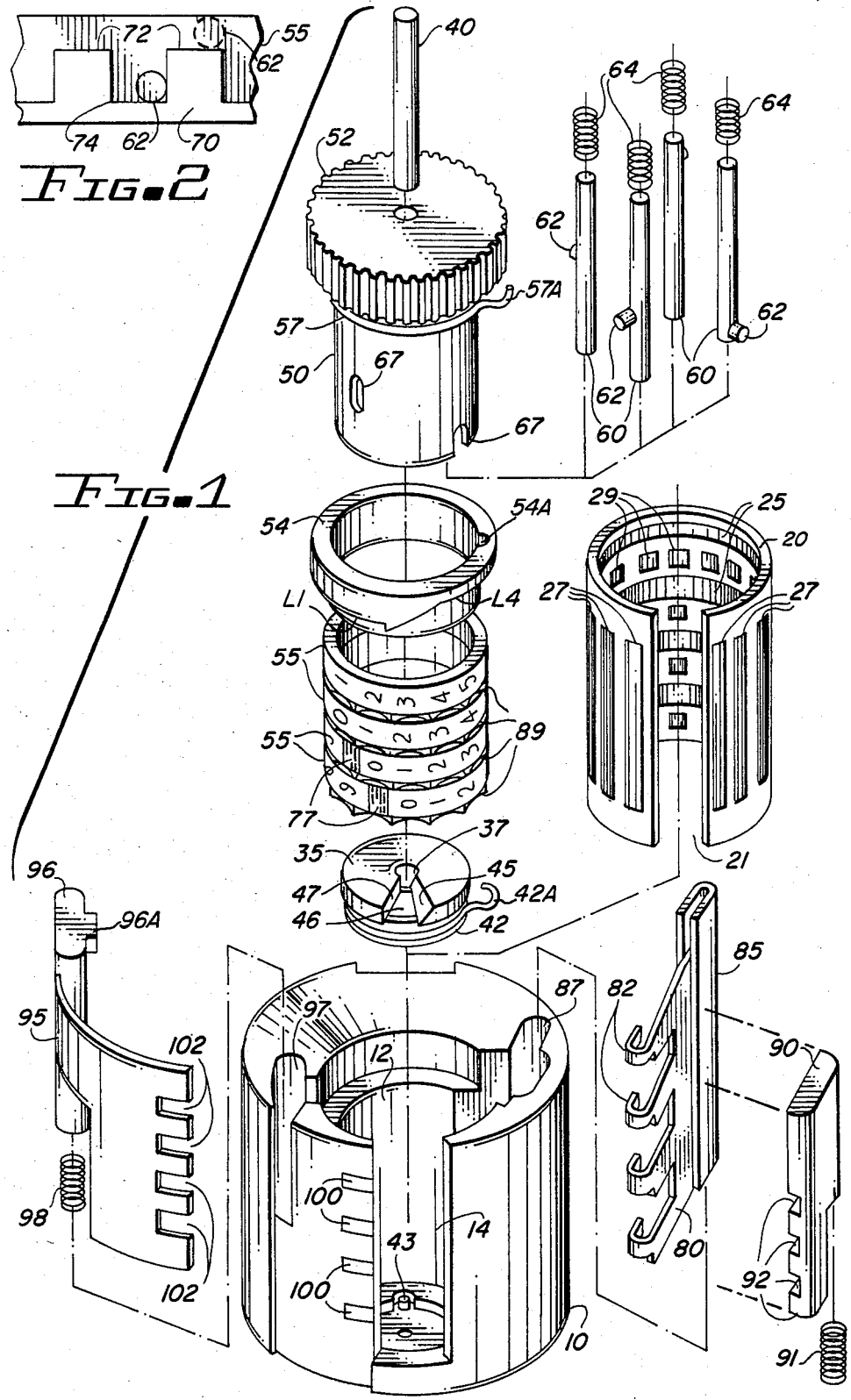

FAST INDEXING ENCODER APPARATUS

BACKGROUND OF THE INVENTION

Encoders are utilized in a wide variety of applications in the electronics industry. Generally, an encoder is some form of electromechanical device that converts a movement or position of a mechanical member to an electrical signal, generally in digital form. If straight decade encoding is performed, for example, ten output leads are required for each input plus one lead for power so that four input leads would result in a total of 41 interconnecting wires. In straight binary coded decimal encoding, 16 interconnecting wires are required for the four inputs in the example above plus one for power. The binary coded decimal encoding also requires the use of five mechanical contacts per input thus reducing encoder reliability. In some instances pure electrical encoders are utilized but it is extremely difficult to insert a desired code during operation in the field.

SUMMARY OF THE INVENTION

The present invention pertains to fast indexing encoder apparatus wherein a plurality of rotatably mounted members each have associated therewith encoding means including a plurality of individually selectable indices and selection means including a rotatable common control coupled to said plurality of members through cam means and a plurality of cammed drivers, said drivers being mounted so that only one is cammed into driving engagement with an associated one of said plurality of members at any one time, for selectively rotating any selected one of said plurality of members individually to a preselected one of said indices.

It is an object of the present invention to provide new and improved fast indexing encoder apparatus requiring a single control for the operation thereof.

It is a further object of the present invention to provide fast indexing encoder apparatus which is simple to manufacture and requires a minimum of parts.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is an exploded view in perspective of fast indexing encoder apparatus embodying the present invention;

FIG. 2 is an enlarged view of a layout of a portion of a ring from the apparatus in FIG. 1.

DESCRIPTION OF THE PREFERRED EMBODIMENT

Figure 3:
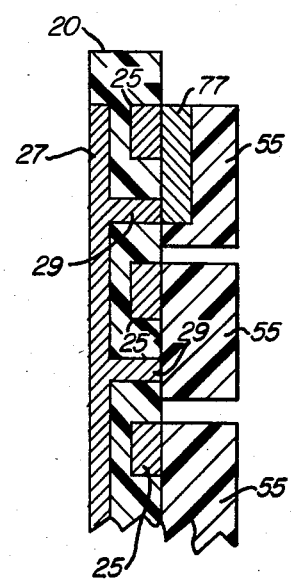
FIG. 3 is a sectional view through parts of FIG. 1, assembled, with portions thereof broken away.

Referring specifically to FIG. 1, a generally cylindrical housing 10 has a generally circularly shaped, centrally located cavity 12 formed therein. An index viewing window 14 is formed in the wall of the housing 10 in communication with the cavity 12. A generally cylindrically shaped contact board 20 is adapted to fit within the cavity 12 and has an opening 21 in the wall thereof adapted to coincide with the window 14 in the housing 10. A plurality (four in this embodiment) of common electrical conductors 25 are formed in the inner surface of the contact board 20 and extend circumferentially therearound in axially spaced apart relationship. A plurality of selectable conductors 27 are formed in the outer surface of the contact board 20 in axially extending relationship and spaced apart circumferentially around the outer surface of the contact board 20. The conductors 25 and 27 could be formed on the contact board 20 in a fashion similar to the manner of producing printed circuit boards, for example, or in any other convenient manner which would provide the functions of the present invention. The selectable conductors 27 are formed with feedthrough contacts 29 on the inner surface of the contact board 20 between each of the spaced apart common conductors 25 so as to form a contact on the inner surface of the contact board 20 for each of the selectable conductors 27 adjacent to but not touching each of the common conductors 25. The contact board 20 is fitted in the cavity 12 so as to be electrically insulated from all conducting material in the housing 10 but some form of external connectors (not shown) will be available to each of the common conductors 25 and each of the selectable conductors 27. These connections could easily be provided on one end of the contact board 20 and project through openings in the housing 10. However, since such connections are well within the ability of those skilled in the art, they have been eliminated from the drawings for simplicity.

A selector cam includes a disk 35 having a centrally located hole 37 for receiving an elongated mounting shaft 40 therethrough. The disk 35 is free to rotate on the shaft 40 and is provided with a spring clutch 42 in engagement with the lower surface thereof. The spring clutch 42 is designed to fit within a depression in the lower surface of the cavity 12 and a hook 32A on the outer end thereof is engaged around an upwardly directed projection 43 in the depression. The spring clutch 42 allows clockwise rotation of the disk 35 but prevents rotation of the disk 35 in the counterclockwise direction. The upper surface of the disk 35 has a depression formed therein with a cam surface 45 defining one radially extending a flat surface 46 defining the bottom and a perpendicular surface 47 defining the other radial edge of the depression.

An indexing cylinder 50 is constructed with a gear 52 at the upper end thereof, which gear 52 is a common control for indexing the encoder apparatus. External apparatus (not shown) is operatively engaged with the gear 52 for easy access and indexing of the encoder apparatus. This external apparatus, which might for example be a housing having an internal gear therein meshing with the gear 52, is not illustrated herein for simplicity and because it does not form a portion of this invention. The indexing cylinder 50 is designed to fit over the disk 35 and to receive an indicator cam 54 and a plurality of members, which in this embodiment are four rings 55, coaxially therearound for free, individual rotation. A spring clutch 57 is engaged coaxially around the indexing cylinder 50 between the lower surface of the gear 52 and the upper surface of the indicator cam 54 and a hooked end 57A engages a notch 54A in the indicator cam 54 to allow free counterclockwise movement thereof with the gear 52 but to prevent clockwise movement thereof with the gear 52.

A driver for each of the rings 55, which in this embodiment includes an elongated rod 60, a perpendicular projection 62 and an axially biasing spring 64, fit within axial openings (not shown) within the indexing cylinder 50. The projections 62 are spaced at different distances from the lower ends of the rods 60 so as to extend radially outwardly through elongated, or oval shaped, openings 67 in the outer wall of the indexing cylinder 50. The openings 67 are formed so that the projections 62 extend therethrough and each engage a different one of the rings 55. With the rods 60 assembled inside of the cylinder 50 and the cylinder 50, indicator cam 54, and rings 55 assembled on the shaft 40 within the cavity 12 the projections 62 extend outwardly through the openings 67 and are held at the uppermost end of the openings 67 by the upper surface of the disk 35. When the gear 52 and indexing cylinder 50 are rotated counterclockwise one of the rods 60 will drop into the depression in the upper surface of the disk 35 and the projection 62 thereon will then extend outwardly at the lower end of its associated opening 67. Reversing the rotation of the gear 52 and indexing cylinder 50 at this time will cause the rods 60 to bear against the perpendicular surface 47 of the depression in the disk 35 so that the disk 35 will be driven in a clockwise direction with the gear 52.

Referring to FIG. 2, a layout view of the inner surface of one of the rings 55 is illustrated. The inner surface of each of the rings 55 has a raised, or radially inwardly projecting portion 70, having upper circumferentially extending edges 72 and lower circumferentially extending edges 74 joined by axially extending portions of a length approximately equal to the length of the openings 67 in the indexing cylinder 50, which is also equal to the depth of the camming depression in the disk 35. When the rod 60 of a specific ring 55 is bearing on the upper surface of the disk 35 the projection 62 rides on, or barely clears, the projecting upper edge 72 of the associated ring 55 (see projection 62 depicted in dated lines). When the rod 60 drops into the depression in the upper surface of the disk 35 and bears on surface 46, the projection 62 drops into engagement with the projecting lower edge 74 and bears against the vertical surface between the upper and lower edge 72 and 74 (see projection 62 depicted in full lines) to drive the associated ring 55 in a clockwise direction. To select a new ring 55 to be indexed the gear 52 is simply reversed (rotated in a counterclockwise direction) the specific rod 60 riding on surface 46 in the depression of the disk 35 is cammed axially by the cam surface 45 to the upper surface of the disk 35, which disengages the projection 62 from the associated ring 55. Additional counterclockwise rotation of the gear 52 drops a new rod 60 onto surface 46 in the depression and engages the projection 62 with its associated ring 55. Direction of the gear 52 is then reversed (clockwise) and the projection 62 drivingly engages the associated ring 55. In this manner all four of the rings 55 can be indexed to the desired position.

Each of the rings 55 has an electrical contact 77 formed on the outer surface thereof and constructed to engage an associated common conductor 25 and one of the feedthrough contacts 29 positioned immediately below each of the common conductors 25. The contact 77 engages the common conductor 25 and the feedthrough contacts 29 as shown in FIG. 3 so as to produce an electrical connection therebetween. Thus, rotation of a specific ring 55 provides an electrical connection between the associated common conductor 25 and any preselected one of the selectable conductors 27. The four common conductors 25 may, for example, provide for independent time settings of the hundreds, tens, units, and tenths decades. Ten selectable conductors 27 are provided so that each of the decades has the required ten steps. Because only ten selectable conductors 27 are provided, power, or ground, is applied to the common conductor 25 (from the external connection described above) sequentially by means of external logic circuitry (not shown) and the output of the ten selectable conductors 27 is gated to a proper counterstage in a digital integrated circuit corresponding to the common conductor 25 (or ring 55) to which power has been applied. For example, if power is applied to the unit common conductor 25 the ten selectable conductors 27 are connected to the unit's counterstage in the integrated circuit. When power is applied to the next common conductor 25 of the encoder, the selectable conductors 27 are in turn switched to the next counter stage. All of the switching is accomplished electronically within an integrated circuit (not shown) associated with the encoder. This method allows the same ten selectable conductors 27 to program all four counterstages and therefore greatly reduces the number of wires to interconnect between the encoder and the electronic assembly. The combination of the four common conductors 25 and the ten selectable conductors 27 provides a potential of 10,000 unique settings.

To ensure the proper alignment of each of the contacts 77 on the rings 55 with the feedthrough contacts 29 on the inner surface of the contact board 20, detent apparatus is provided. A detent spring 80 is formed with four hook-shaped leaf springs 82 mounted by means of a slotted mounting member 85 which fits in a cavity 87 adjacent the cylindrical cavity 12. With the mounting member 85 engaged in the cavity 87 the leaf springs 82 project into the cavity 12 with the leaf springs 82 being spaced apart axially a distance sufficient to associate each of the leaf springs 82 with a different one of the rings 55. The rings 55 each have 11 depressions 89 formed in the outer surface thereof and adapted to receive the hook shaped end of the associated leaf spring 82. The leaf springs 82 are biased into the depressions 89 to provide a detent action for the proper alignment of each of the rings 55. A locking bar 90 having a biasing spring 91 associated therewith is constructed to fit into the cavity 87 radially outwardly from the detent spring 80 adjacent the leaf springs 82. The leaf springs 82 are normally positioned in radial alignment with depressions 92 in the locking bar 90 which allows radial movement and, consequently, the normal detent action of the leaf springs 82. By depressing the locking bar 90, against the biasing action of the spring 91, the depressions 92 are moved away from the leaf springs 82 and the leaf springs 82 are locked into a specific depression 89 in the associated ring 55 to prevent rotary movement of the ring 55. While the locking bar 90 is illustrated as a manually-depressible lock it will be understood by those skilled in the art that apparatus can be included therewith for locking the bar 90 in the depressed position, if desired.

Indicator apparatus 95 includes an elongated bar 96 designed to fit within a cavity 97 adjacent the central cavity 12 in the housing 10. A biasing spring 98 is designed to precede the bar 96 in the cavity 97 and bias the bar 96 axially upwardly. A projection 96A at the upper end of the bar 96 is designed to engage a cam surface L1–L4 (L2 and L3 not shown) on the indicator cam 54. As the indicator cam 54 is rotated in the counterclockwise direction the bar 96 is cammed axially. The indicator cam 54 has four cam surfaces L1–L4 thereon to coincide with the four rings 55. Four indicator marks 100 are provided on the outer surface of the housing 10 adjacent the left side of the window 14. The indicator apparatus 95 has an arcuately shaped plate having four openings 102 formed in the outwardly extended end thereof. When the bar 96 is moved axially so that one of the openings 102 overlies one of the indicator marks 100, that indicator mark 100 becomes visible to the operator and provides an indication of the specific ring 55 which is in position to be indexed. As the gear 52 is rotated counterclockwise the next ring 55 is engaged by the selection means and the indicator cam 54 moves the bar 96 so that the next opening 102 uncovers the next indicator mark 100.

Thus, fast indexing encoder apparatus is described and illustrated which requires fewer mechanical parts and is quickly and easily operated. While the contact board 20 surrounds the rings 55 and the driving mechanism is mounted within the rings 55 in this embodiment, it will be clear to one skilled in the art that a configuration wherein the parts have an opposite relationship could be devised. While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. Fast indexing encoder apparatus comprising:
   a plurality of rotatably mounted members each having contact means engaging encoding means of a generally cylindrically shaped contact board and further including a plurality of individually selectable indices; and
   selection means including a rotatable common control coupled to said plurality of members through cam means and a plurality of cammed drivers, said drivers being mounted so that only one is cammed into driving engagement with an associated one of said plurality of members at any time, for selectively rotating any selected one of said plurality of members individually to a preselected one of said indices.

2. Fast indexing encoder apparatus as claimed in claim 1 wherein the rotatable members are rings each having an electrical contact formed in an outer periphery thereof and the encoding means includes one common electrical conductor for each of the rings and a plurality of selectable conductors, each selectable conductor in association with an indicator forming an individually selectable index, said electrical contact being positioned to continuously engage said common conductor and to engage each of said selectable conductors in turn as said ring is rotated.

3. Fast indexing encoder apparatus as claimed in claim 2 wherein the one common conductor and the plurality of selectable conductors are included in a generally cylindrically shaped contact board.

4. Fast indexing encoder apparatus as claimed in claim 3 wherein said contact board is positioned coaxially around said rings and contains an opening therein for viewing index indications on the surface of said rings.

5. Fast indexing encoder apparatus as claimed in claim 4 wherein the one common conductor for each of the rings includes circumferentially extending, axially spaced apart conductors formed in the inner surface of said contact board and the selectable conductors include axially extending, circumferentially spaced apart conductors.

6. Fast indexing encoder apparatus as claimed in claim 5 wherein the selectable conductors extend substantially the axial length of said contact board on the outer surface thereof, with contact portions thereof on the inner surface of said contact board spaced between the circumferentially extending conductors.

7. Fast indexing encoder apparatus as claimed in claim 1 wherein the cam means includes a disk mounted to rotate with said common control in a first direction and to remain stationary relative to said common control in a second direction, one of said drivers engaging said disk and the associated ring during rotation of said disk in the first direction.

8. Fast indexing encoder apparatus as claimed in claim 7 wherein said disk includes a single cam and driving surface and said drivers are elongated members mounted for axial movement parallel to the rotary axis of said rings with projections thereon positioned to engage the associated ring when the driver is engaged with the driving surface of said disk and to be cammed out of engagement with the associated ring when the common control is rotated in the second direction.

9. Fast indexing encoder apparatus as claimed in claim 8 wherein the single cam and driving surface include a depression in a surface of said disk, one side of said depression being sloped to form a cam and the opposite side being generally unsloped.

10. Fast indexing encoder apparatus as claimed in claim 1 including in addition spring means associated with each of said plurality of members, each of said plurality of members further having a plurality of depressions formed therein, one for each of said pluralities of indices, said spring means and said depression cooperating to provide detent action to properly align each index.

* * * * *